US009243686B2

(12) United States Patent  (10) Patent No.: US 9,243,686 B2
Saji  (45) Date of Patent: Jan. 26, 2016

(54) MESHING CHAIN STOPPER

(75) Inventor: Tomoyuki Saji, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 218 days.

(21) Appl. No.: 13/978,278

(22) PCT Filed: Dec. 12, 2011

(86) PCT No.: PCT/JP2011/078679
§ 371 (c)(1),
(2), (4) Date: Jul. 3, 2013

(87) PCT Pub. No.: WO2012/093559
PCT Pub. Date: Jul. 12, 2012

(65) Prior Publication Data
US 2013/0276422 A1 Oct. 24, 2013

(30) Foreign Application Priority Data
Jan. 5, 2011 (JP) ................................. 2011-000572

(51) Int. Cl.
F16G 13/20 (2006.01)
F16G 15/00 (2006.01)
B66F 3/06 (2006.01)
F16G 13/06 (2006.01)

(52) U.S. Cl.
CPC . *F16G 15/00* (2013.01); *B66F 3/06* (2013.01); *F16G 13/06* (2013.01); *F16G 13/20* (2013.01)

(58) Field of Classification Search
CPC ......... F16G 15/00; F16G 13/20; F16G 13/06; B66F 3/06

USPC ............................................................ 59/93
See application file for complete search history.

(56) References Cited

U.S. PATENT DOCUMENTS

| 3,645,146 | A | 2/1972 | Nagin |
| 5,355,643 | A | 10/1994 | Bringolf |
| 7,270,619 | B2 * | 9/2007 | Bourc'His ..................... 474/202 |
| 7,921,986 | B2 | 4/2011 | Ando |
| 8,069,954 | B2 * | 12/2011 | Kempf .......................... 187/250 |
| 8,500,101 | B2 * | 8/2013 | Yaoi et al. ..................... 254/372 |

(Continued)

FOREIGN PATENT DOCUMENTS

| CA | 2070284 | 4/1992 |
| EP | 0799788 A1 | 12/1995 |

(Continued)

OTHER PUBLICATIONS

International Search Report prepared by the Japanese Patent Office on Mar. 13, 2012, for International Application No. PCT/JP2011/078755.

(Continued)

*Primary Examiner* — David B Jones
(74) *Attorney, Agent, or Firm* — Sheridan Ross P.C.

(57) ABSTRACT

Chain detachment and chain entry are avoided, and a process for setting the length of a meshing chain is avoided, while the chain feed length can also be freely changed. A meshing chain stopper (190L) comprises a meshing chain stopper attachment part (191) and a contact-stop protrusion (192). The contact-stop protrusion (192) is contact-stopped at a contact-stop point (173A) provided on the periphery of a chain locus (L) when a pair of meshing chains (150, 150) are being driven.

6 Claims, 12 Drawing Sheets

(56) References Cited

U.S. PATENT DOCUMENTS

| | | | |
|---|---|---|---|
| 8,776,491 B2* | 7/2014 | Oitaka et al. ............... 59/78 |
| 8,984,975 B2* | 3/2015 | Saji et al. ............... 74/89.2 |
| 2006/0219144 A1 | 10/2006 | Phelan et al. |
| 2009/0166155 A1 | 7/2009 | Hishioka et al. |
| 2010/0059727 A1 | 3/2010 | Suko |
| 2010/0140572 A1 | 6/2010 | Aoki |
| 2013/0276422 A1* | 10/2013 | Saji ............... 59/93 |
| 2013/0283945 A1 | 10/2013 | Kaisaku et al. |
| 2013/0298705 A1 | 11/2013 | Saji et al. |
| 2013/0312554 A1 | 11/2013 | Saji et al. |

FOREIGN PATENT DOCUMENTS

| | | |
|---|---|---|
| EP | 0799788 | 10/1997 |
| JP | S51-131060 | 11/1976 |
| JP | S64-058833 | 3/1989 |
| JP | H03-012646 | 1/1991 |
| JP | H05-3300 | 1/1993 |
| JP | H06-13399 | 4/1994 |
| JP | 2009-119495 A | 5/1997 |
| JP | H09-119495 | 5/1997 |
| JP | H11-278797 | 10/1999 |
| JP | 3384491 | 12/2002 |
| JP | 2007-269414 | 10/2007 |
| JP | 2008-256202 | 10/2008 |
| JP | 2009-001398 A | 1/2009 |
| JP | 2009-113872 | 5/2009 |
| JP | 2009-242010 | 10/2009 |
| JP | 2009-255997 | 11/2009 |
| JP | 2010-047384 | 3/2010 |
| JP | 2010-065721 | 3/2010 |
| JP | 2010-138926 | 6/2010 |
| WO | WO 92/07154 | 4/1992 |

OTHER PUBLICATIONS

International Search Report prepared by the Japanese Patent Office on Apr. 17, 2012, for International Application No. PCT/JP2011/080166.

International Search Report prepared by the Japanese Patent Office on Apr. 17, 2012, for International Application No. PCT/JP2011/080160.

International Search Report prepared by the Japanese Patent Office on Jun. 12, 2012, for International Application No. PCT/JP2012/056703.

International Search Report prepared by the Japanese Patent Office on Jul. 17, 2012, for International Application No. PCT/JP2012/061567.

International Search Report prepared by the Japanese Patent Office on Jan. 17, 2012, for International Application No. PCT/JP2011/078679.

* cited by examiner

Traveling direction D2
of interlocking chain

MESHING CHAIN STOPPER

CROSS REFERENCE TO RELATED APPLICATIONS

This application is a national stage application under 35 U.S.C. 371 and claims the benefit of PCT Application No. PCT/JP2011/078679 having an international filing date of 12 Dec. 2011, which designated the U.S, and which PCT application claimed the benefit of Japanese Patent Application No. 2011-000572 filed 5 Jan. 2011, the disclosure of which is incorporated herein by reference.

FIELD OF THE INVENTION

The present invention relates to an interlocking chain stopper for restricting driving of interlocking chains.

BACKGROUND OF THE INVENTION

Conventionally, a type of an actuator has been known which driving sprockets engaged with interlocking chains are rotated to thereby drive paired interlocking chains for forward and backward movements (see Patent Document 1, for example).

In the above-described interlocking chain type lift device, as shown in FIG. 13, slipping out of the chains, in which the interlocking chains 250 slip out of a chain guide 272 after ends of the interlocking chains 250 pass through sprocket teeth of a driving sprocket 240, may occur. Therefore a control means that refers to positional information output from a position sensor for detecting the positions of the interlocking chains 250 is provided to electrically or mechanically control the rotation speed of a chain driving motor.

PRIOR ART DOCUMENTS

Patent Documents

Patent Document 1: Japanese Laid-Open Patent Publication No. 2009-1398 (Claims, FIG. 3)

SUMMARY OF THE INVENTION

However, in the above-described interlocking chain type lift device, it is difficult to visually detect problems in the position sensor and the control means in inspection before the start of operation. Therefore, it is difficult to reliably avoid the slipping out of the chains by always carrying out electrical or mechanical control of driving of the interlocking chains 250 by using the normal position sensor and the like during the operation of the device.

Moreover, since it is not possible to increase a processing speed of control processing for the driving motor, which is carried out in driving the interlocking chains 250 at high speed, to such a speed that the processing can control the driving of the interlocking chains 250 in some cases, it is difficult to restrict the driving of the interlocking chains 250 to thereby reliably avoid the slipping out of the chains.

Furthermore, in the above-described interlocking chain type lift device, the interlocking chains 250 are reeled in by electrically or mechanically controlling the driving of the interlocking chains and therefore a chain unreeled portion that is unreeled as a rigid body from the chain guide 272 to the outside of the device excessively enters the chain guide 272.

In the above-described interlocking chain type lift device, the interlocking chains having lengths adjusted according to usage of the device are mounted to a device unit. This requires a step for adjusting the lengths of the interlocking chains in advance according to the usage of the device so as to set the lengths of the interlocking chains according to a predetermined chain unreeled length.

In the above-described interlocking chain type lift device, the lengths of the interlocking chains once mounted to the device unit cannot be changed. Therefore, it is difficult to freely change the chain unreeled length of the interlocking chains, which defines a driving limit position of a driven body such as a table to be moved forward and backward by the driving of the interlocking chains, i.e., the length of the chain unreeled portion actually unreeled as a rigid body to the outside of the device along the chain guide during the operation of the device according to usage of the device.

Accordingly, a technical problem to be solved by the present invention, i.e., an object of the present invention is to provide an interlocking chain stopper with which slipping out of chains and excessive entry of the chains into a chain guide during driving of the chains in a device including the interlocking chains can be avoided, a step for setting lengths of the interlocking chains can be omitted, and a chain unreeled length can be changed freely according to usage of the device after the interlocking chains are once mounted to the device.

The invention of claim 1 solves the above described problems by providing an interlocking chain stopper to be mounted into a clearance area formed between paired hook-shaped inner tooth plates located in at least one of paired interlocking chains that include pairs of hook-shaped inner tooth plates and pairs of hook-shaped outer tooth plates. The hook-shaped inner tooth plates of each pair are located away from each other in a chain width direction and connected and fixed to each other by respectively fitting front and back paired connecting pins into bushings and press-fitting the bushings into the hook-shaped inner tooth plates. The hook-shaped outer tooth plates of each pair are respectively arranged to be adjacent to outer sides of the paired hook-shaped inner tooth plates in the chain width direction. The hook-shaped outer tooth plates are arranged alternately with the hook-shaped inner tooth plates with respect to the connecting pins in a chain longitudinal direction with the front and back paired connecting pins respectively press-fitted into the hook-shaped outer tooth plates. The paired interlocking chains are formed by connecting a large number of hook-shaped inner tooth plates and a large number of hook-shaped outer tooth plates by pairs of the front and back connecting pins in the chain longitudinal direction. The paired interlocking chains get interlocked with each other to become rigid and get disengaged from each other to bifurcate. The interlocking chain stopper further includes a contact-stop protrusion protruding outside the hook-shaped inner tooth plates and the hook-shaped outer tooth plates, respectively, from an interlocking chain stopper mounting portion in a direction toward an inner side of a chain locus when the one interlocking chain bends during driving of the paired interlocking chains when seen from the one interlocking chain. The contact-stop protrusion is brought into contact with and stopped by a contact-stop point provided at a periphery of the chain locus during driving of the paired interlocking chains.

The invention of claim 2 solves the above described problems by providing, in addition to the configuration of claim 1, a configuration in which the interlocking chain stopper mounting portion has an inner peripheral face along an outer peripheral face of the bushing into which one of the front and back paired connecting pins is fitted or along an outer peripheral face of a roller fitted over the bushing, a U-shaped mounting portion for surrounding, from a traveling direction of the one interlocking chain, the bushing into which the one connecting pin is fitted or the roller fitted over the bushing, and paired straight leg portions, which extend along the chain locus of the one interlocking chain from opposite ends of the U-shaped mounting portion and are located on opposite sides of at least the one connecting pin.

The invention of claim 3 solves the above described problems by providing, in addition to the configuration of claim 2, a configuration in which the paired straight leg portions respectively extend from the one connecting pin to the other connecting pin of the front and back paired connecting pins.

The invention of claim 4 solves the above described problems by providing, in addition to the configuration of claim 2 or 3, a configuration in which an outer face of the U-shaped mounting portion and an inner peripheral face of the U-shaped mounting portion overlap arcs of two concentric circles about a center of the one connecting pin in an imaginary plane intersecting a center line of the one connecting pin. A thickness of the U-shaped mounting portion is set such that the U-shaped mounting portion can be fitted between i) the bushing in contact with the inner peripheral face of the U-shaped mounting portion or the roller fitted over the bushing and ii) the bushing or the roller adjacent to the bushing in contact with the inner peripheral face of the U-shaped mounting portion or the roller fitted over the bushing.

The invention of claim 5 solves the above described problems by providing, in addition to the configuration of claim 4, a configuration in which the outer face of the U-shaped mounting portion is formed by an outer arc face facing the direction toward the inner side of the chain locus when the one interlocking chain bends, and an outer flat face that faces in a direction toward an outer side of the chain locus when the one interlocking chain bends and is continuous from the outer arc face.

The interlocking chain stopper according to claim 1 of the present invention can be mounted into the clearance area formed between the paired hook-shaped inner tooth plates located in at least one of the paired interlocking chains that include the pairs of hook-shaped inner tooth plates and the pairs of hook-shaped outer tooth plates. The hook-shaped inner tooth plates of each pair are located away from each other in the chain width direction and connected and fixed to each other by respectively fitting the front and back paired connecting pins into bushings and press-fitting the bushings into the hook-shaped inner tooth plates. The hook-shaped outer tooth plates of each pair are respectively arranged to be adjacent to outer sides of the paired hook-shaped inner tooth plates in the chain width direction. The hook-shaped outer tooth plates are arranged alternately with the hook-shaped inner tooth plates with respect to the connecting pins in the chain longitudinal direction with the front and back paired connecting pins respectively press-fitted into the hook-shaped outer tooth plates. The paired interlocking chains are formed by connecting a large number of hook-shaped inner tooth plates and a large number of hook-shaped outer tooth plates by pairs of the front and back connecting pins in the chain longitudinal direction. The paired interlocking chains are engaged with each other to become rigid and are disengaged from each other to bifurcate. In addition, the following characteristic advantages are obtained.

In other words, the interlocking chain stopper according to claim 1 of the present invention includes the contact-stop protrusion protruding outside the hook-shaped inner tooth plates and the hook-shaped outer tooth plates, respectively, from the interlocking chain stopper mounting portion in the direction toward the inner side of the chain locus when one of the interlocking chains bends during driving of the paired interlocking chains when seen from the one interlocking chain. The contact-stop protrusion is brought into contact with and stopped by the contact-stop point provided at the periphery of the chain locus during driving of the paired interlocking chains. In this way, the interlocking chain stopper stops driving of the paired interlocking chains without carrying out electrical or mechanical control processing using a position sensor or the like. Therefore, slipping out of the chains and excessive entry of the chains into a chain guide can be reliably avoided by restricting driving of the paired interlocking chains. Moreover, a step for setting lengths of the interlocking chains can be omitted and a chain unreeled length can be changed freely according to usage of a device by changing a position of the one interlocking chain where the interlocking chain stopper is mounted after the interlocking chains are once mounted to the device.

With the interlocking chain stopper according to claim 2 of the present invention, in addition to the advantages obtained by the interlocking chain stopper according to claim 1, the interlocking chain stopper mounting portion has an inner peripheral face along an outer peripheral face of the bushing into which one of the front and back paired connecting pins is fitted or along an outer peripheral face of the roller fitted over the bushing. The U-shaped mounting portion surrounds, from a traveling direction of the one interlocking chain, the bushing into which the one connecting pin is fitted or the roller fitted over the bushing. The paired straight leg portions extend along the chain locus of the one interlocking chain from the opposite ends of the U-shaped mounting portion and are located on the opposite sides of at least the one connecting pin. In this way, the interlocking chain stopper is reliably fixed and backlash of the interlocking chain stopper during the driving of the interlocking chains is avoided. Therefore, the mounted position of the interlocking chain stopper can be changed and the interlocking chain stopper can be fixed to the interlocking chain at the same time.

With the interlocking chain stopper according to claim 3 of the present invention, in addition to the advantages obtained by the interlocking chain stopper according to claim 2, the paired straight leg portions respectively extend from the one connecting pin to the other connecting pin of the front and back paired connecting pins. Therefore, force applied from the contact-stop protrusion when the contact-stop protrusion is brought into contact with the contact-stop point is dispersed to the front and back paired connecting pins. Therefore, force applied to the interlocking chain stopper and the one interlocking chain to which the interlocking chain stopper is mounted is not concentrated on a certain point to thereby avoid damage to the interlocking chain stopper and the one interlocking chain, slipping out and excessive entry of the chains are reliably avoided, the step for setting the lengths of the interlocking chains can be avoided, and the chain unreeled length can be changed freely.

With the interlocking chain stopper according to claim 4 of the present invention, in addition to the advantages obtained by the interlocking chain stopper according to claim 2 or 3, the outer face of the U-shaped mounting portion and the inner peripheral face of the U-shaped mounting portion overlap the arcs of the two concentric circles about the center of the one connecting pin in the imaginary plane intersecting the center line of the one connecting pin. The thickness of the U-shaped mounting portion is set such that the U-shaped mounting portion can be fitted between i) the bushing in contact with the inner peripheral face of the U-shaped mounting portion or the roller fitted over the bushing and ii) the bushing or the roller adjacent to the bushing in contact with the inner peripheral face of the U-shaped mounting portion or the roller fitted over the bushing. In this way, the interlocking chain stopper is inserted between the bushings or the rollers adjacent to each other while the one interlocking chain is bent in the direction toward the outer side of the chain locus and the interlocking chain stopper is located between the paired hook-shaped inner tooth plates without coming off of the U-shaped mounting portion from the interlocking chain and obstruction of bending of the interlocking chain. Therefore, driving of the interlocking chain is not obstructed and coming off of the interlocking chain stopper is avoided until the contact-stop protrusion is brought into contact with the contact-stop point, slipping out of the chains and excessive entry of the chains are avoided, and the constant chain unreeled length according to the mounted position is maintained.

With the interlocking chain stopper according to claim 5 of the present invention, in addition to the advantages obtained by the interlocking chain stopper according to claim 4, the outer face of the U-shaped mounting portion is formed by the outer arc face facing the direction toward the inner side of the chain locus when the one interlocking chain bends. The outer flat face that faces in a direction toward the outer side of the chain locus when the one interlocking chain bends and is continuous from the outer arc face. In this way, the interlocking chain stopper does not allow the outer flat face to interfere with the connecting pin on the side of the chain traveling direction when the interlocking chain stopper is mounted while the one interlocking chain is bent in the direction toward the outer side of the chain locus during the driving of the paired interlocking chains when seen from the one interlocking chain and the interlocking chain stopper causes the outer arc face to directly or indirectly interfere with the bushing or the roller while the one interlocking chain is bent in the direction toward the inner side of the chain locus during the driving of the paired interlocking chains when seen from the one interlocking chain. Therefore, the interlocking chain stopper is detachably mounted to the one interlocking chain, the slipping out of the chains and the excessive entry of the chains are avoided by preventing the interlocking chain stopper from coming off the one interlocking chain unless the one interlocking chain is bent largely in the above-described direction toward the outer side, the step for setting the lengths of the interlocking chains is avoided, and the unreeled length of the interlocking chain can be easily changed by changing the mounted position.

DETAILED DESCRIPTION OF THE PREFERRED EMBODIMENTS

Figure 1:
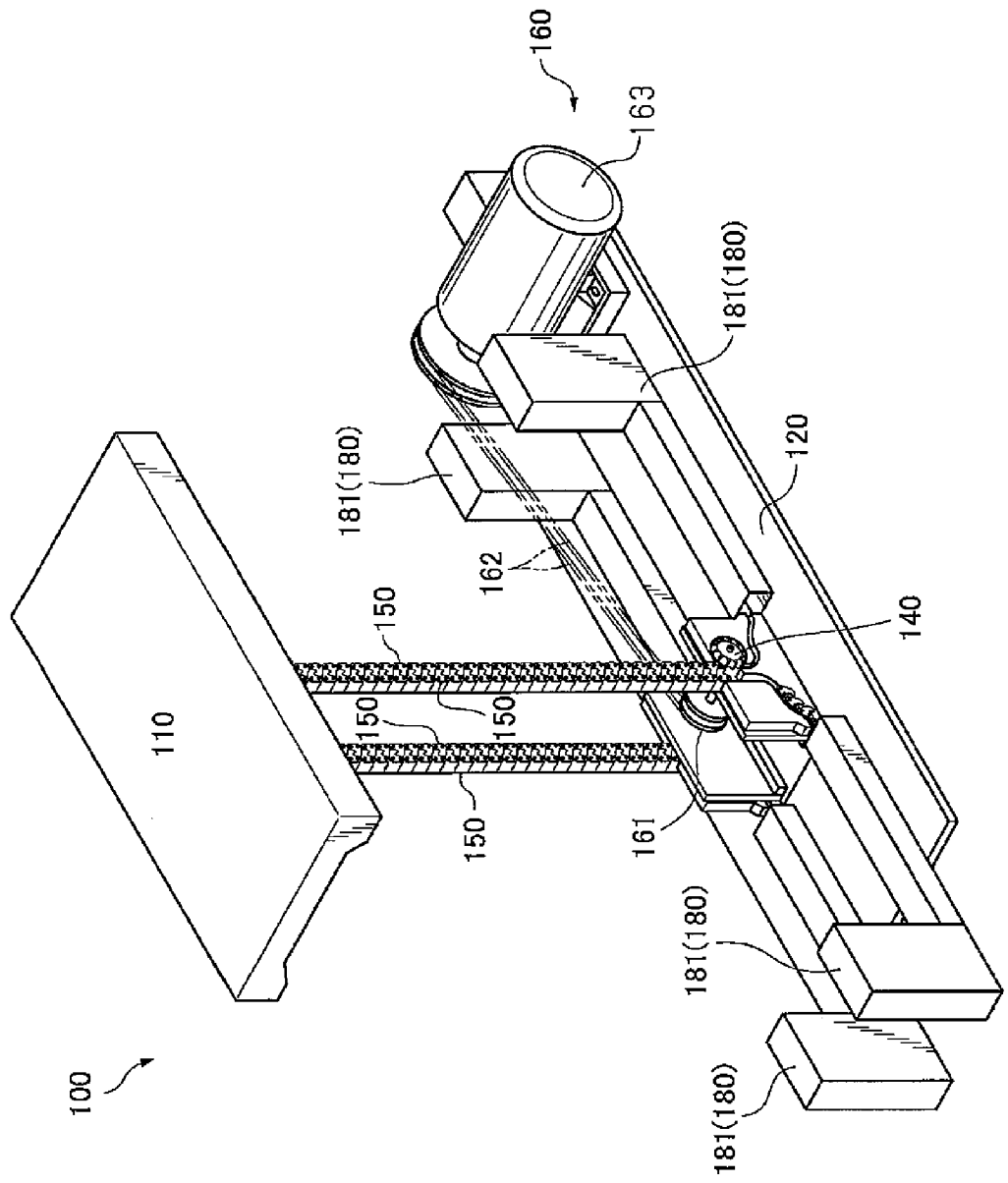
FIG. 1 is a general perspective view of an interlocking chain type forward and backward actuating device including interlocking chains to which an interlocking chain stopper according to one embodiment of the present invention is mounted.

An interlocking chain stopper according to the present invention is to be mounted into a clearance area formed between paired hook-shaped inner tooth plates located in at least one of paired interlocking chains that include pairs of hook-shaped inner tooth plates and pairs of hook-shaped outer tooth plates. The hook-shaped inner tooth plates of each pair are located away from each other in a chain width direction and connected and fixed to each other by respectively fitting front and back paired connecting pins into bushings and press-fitting the bushings into the hook-shaped inner tooth plates. The hook-shaped outer tooth plates of each pair are respectively arranged to be adjacent to outer sides of the paired hook-shaped inner tooth plates in the chain width direction. The hook-shaped outer tooth plates are arranged alternately with the hook-shaped inner tooth plates with respect to the connecting pins in a chain longitudinal direction with the front and back paired connecting pins respectively press-fitted into the hook-shaped outer tooth plates. The paired interlocking chains are formed by connecting a large number of hook-shaped inner tooth plates and a large number of hook-shaped outer tooth plates by pairs of the front and back connecting pins in the chain longitudinal direction. The paired interlocking chains get interlocked with each other to become rigid and get disengaged from each other to bifurcate. The interlocking chain stopper includes a contact-stop protrusion protruding outside the hook-shaped inner tooth plates and the hook-shaped outer tooth plates, respectively, from an interlocking chain stopper mounting portion in a direction toward an inner side of a chain locus when the one interlocking chain bends during driving of the paired interlocking chains when seen from the one interlocking chain. The contact-stop protrusion is brought into contact with and stopped by a contact-stop point provided at a periphery of the chain locus during driving of the paired interlocking chains. The concrete mode for carrying out the invention may be any mode with which the driving of the paired interlocking chains is restricted to reliably avoid slipping out of the chains and excessive entry of the chains into a chain guide, a step for setting lengths of the interlocking chains is avoided, and a chain unreeled length can be changed freely according to usage of a device by changing a position of the one interlocking chain where the interlocking chain stopper is mounted after the interlocking chains are once mounted to the device.

The interlocking chain stopper mounting portion may be provided in the clearance area formed between the paired hook-shaped inner tooth plates in any manner as long as the driving of the chains is not obstructed.

"The inner side of the chain locus" in the invention refers to a radially inner side of the substantially arc-shaped chain locus portion formed by the interlocking chain when the one interlocking chain is driven.

"The traveling direction of the one interlocking chain" in the invention when driving the one interlocking chain such that the paired interlocking chains get interlocked with each other is opposite to "traveling direction" when disengaging the paired interlocking chains that are interlocked with each other from each other. Therefore, in order to restrict the interlocking chains in each of the above-described two kinds of driving, the interlocking chain stopper is mounted by mounting the U-shaped mounting portion in each of opposite orientations to the bushing into which one of the connecting pins is fitted or the roller fitted over the bushing.

In order to restrict the driving of the interlocking chains both in the chain interlocking driving and the chain disengagement driving described above, the two interlocking chain stoppers may be mounted in different positions of the one interlocking chain as long as the inner peripheral faces of the U-shaped mounting portions are in the opposite orientations along the chain locus.

As "the contact-stop point" in the invention, an existing structure portion of an interlocking chain type forward and backward actuating device employing interlocking chains, which are an example of an object to have the interlocking chain stopper, may be used as the contact-stop point as well or a contact-stop wall portion may be provided separately at a periphery of the chain locus and especially as the contact-stop point.

The interlocking chain to which the interlocking chain stopper according to the invention is mounted may be formed by fitting the connecting pins into the bushings or may include the rollers fitted over the bushings and rotatable about the bushings.

It is also possible to mount a plurality of interlocking chain stoppers along the chain width direction in preparation for breakage of the interlocking chain stopper, thereby reliably restricting the chain driving.

Moreover, the interlocking chain stopper according to the invention can restrict the chain driving without trouble even if it is mounted to an interlocking chain that is actuated for forward and backward movements in the vertical direction or the horizontal direction.

Embodiment

An interlocking chain stopper according to one embodiment of the invention will be described below with reference to FIGS. 1 to 11.

Figure 2:
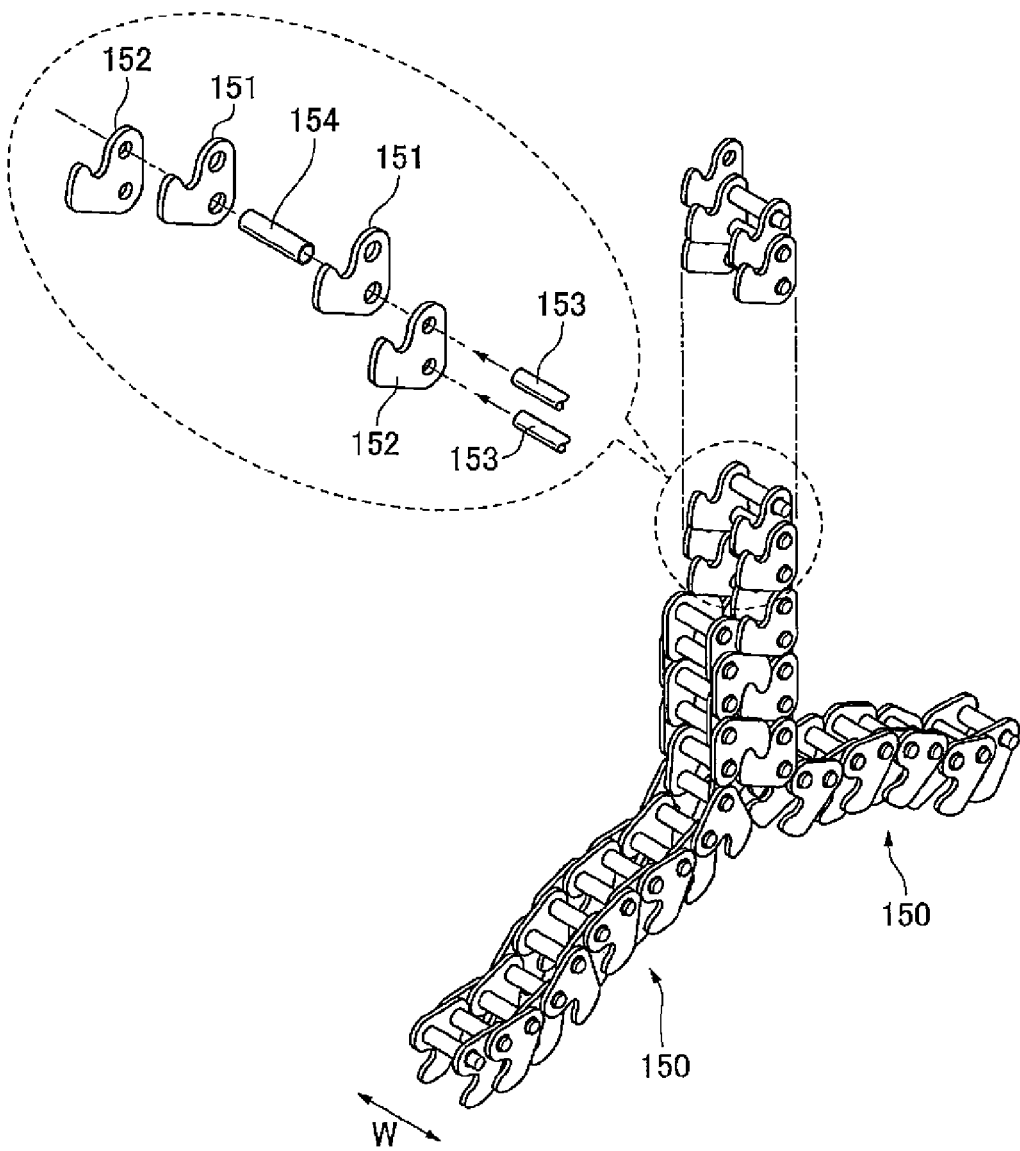
FIG. 2 is a perspective view showing an exploded state and a disengaged state of the pair of interlocking chains.
Figure 3:
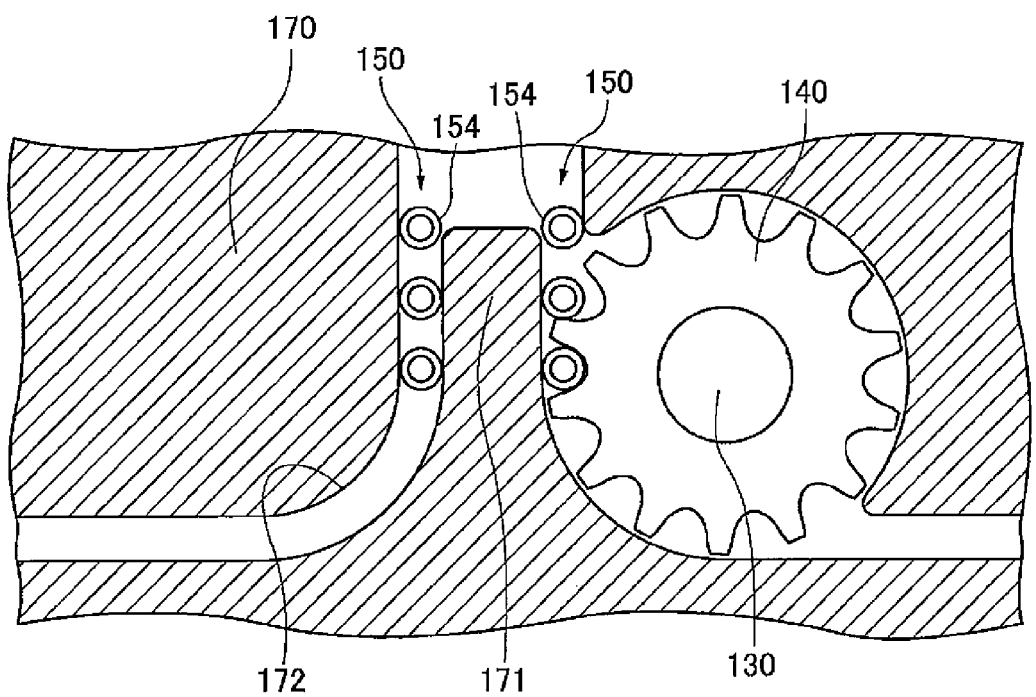
FIG. 3 is an enlarged cross-sectional view of a portion near a driving sprocket and the interlocking chains shown in FIG. 1.
Figure 4:
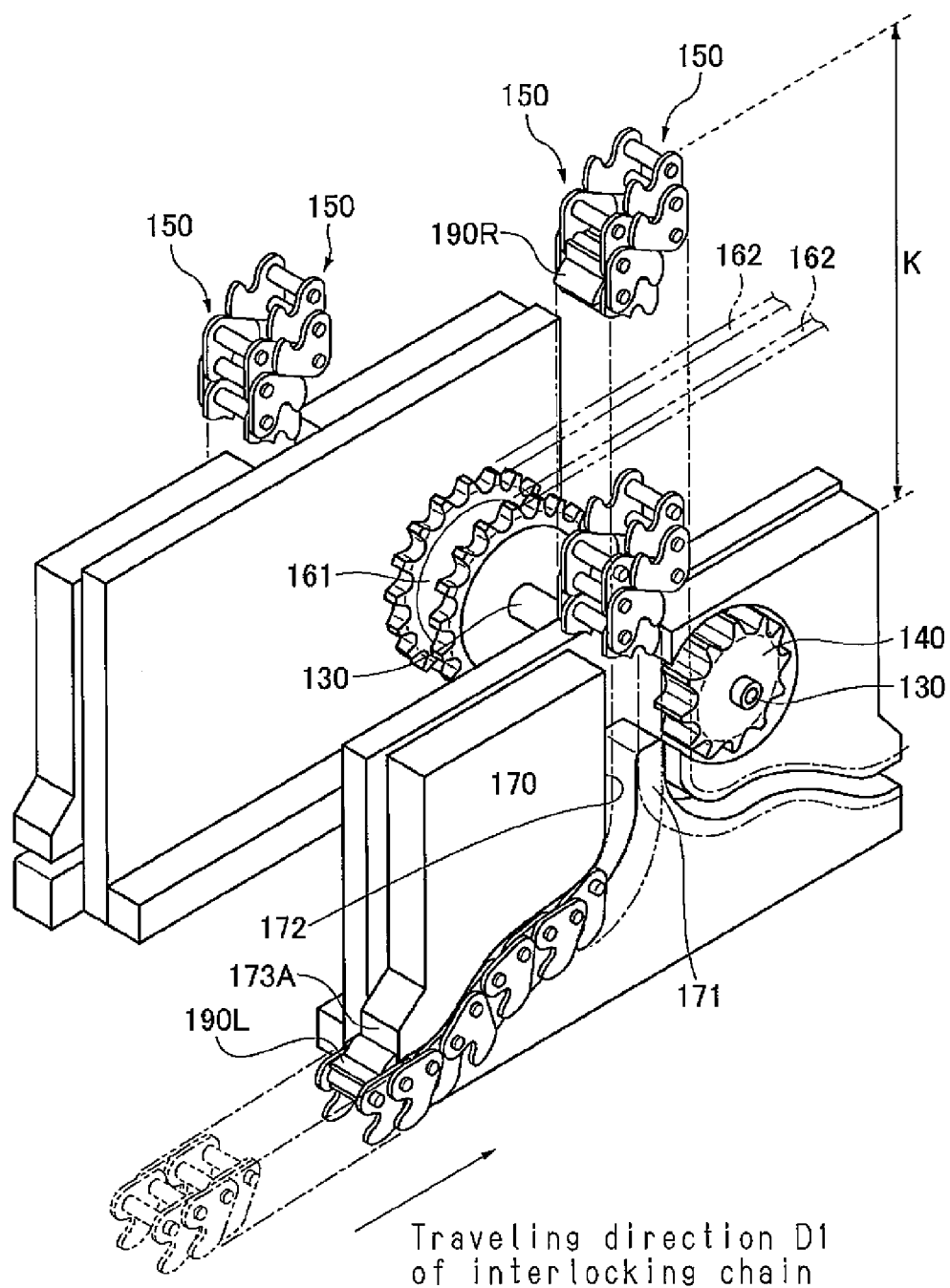
FIG. 4 is an enlarged perspective view of the portion near the driving sprocket and the interlocking chains shown in FIG. 1.
Figure 5:
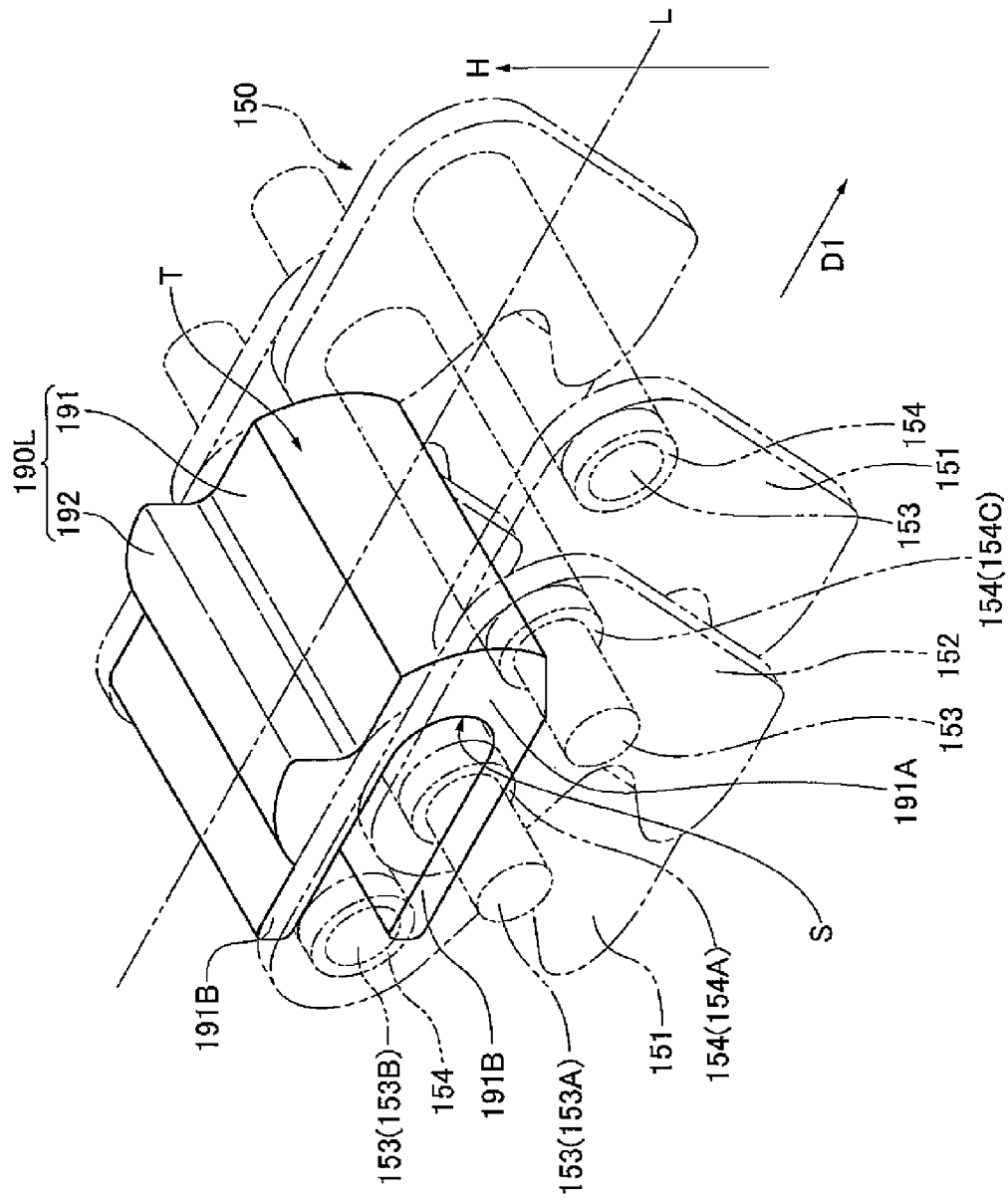
FIG. 5 is a perspective view of a mounted state of the interlocking chain stopper according to the embodiment of the invention.
Figure 6:
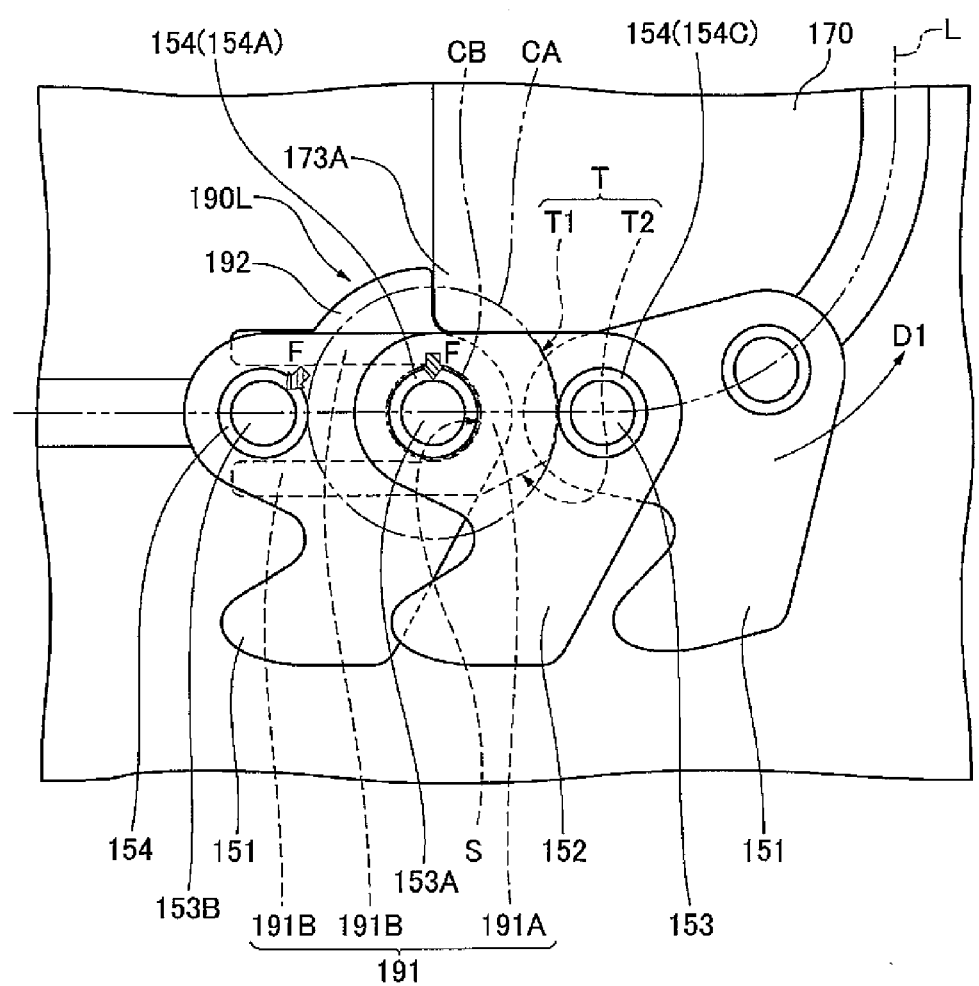
FIG. 6 is an enlarged view of a contact-stopped state of the interlocking chain stopper shown in FIG. 4.
Figure 7:
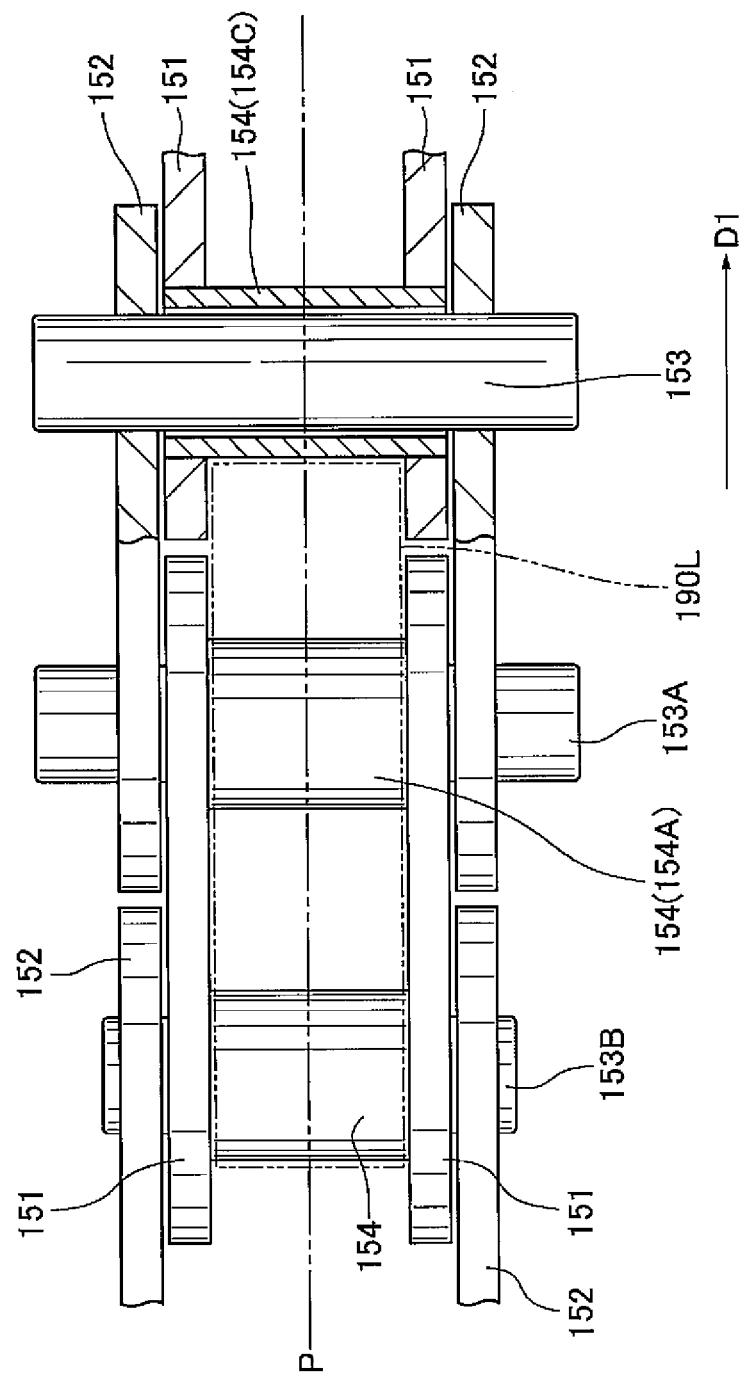
FIG. 7 is a plan view of a mounted state of the interlocking chain stopper according to the embodiment of the invention.
Figure 8:
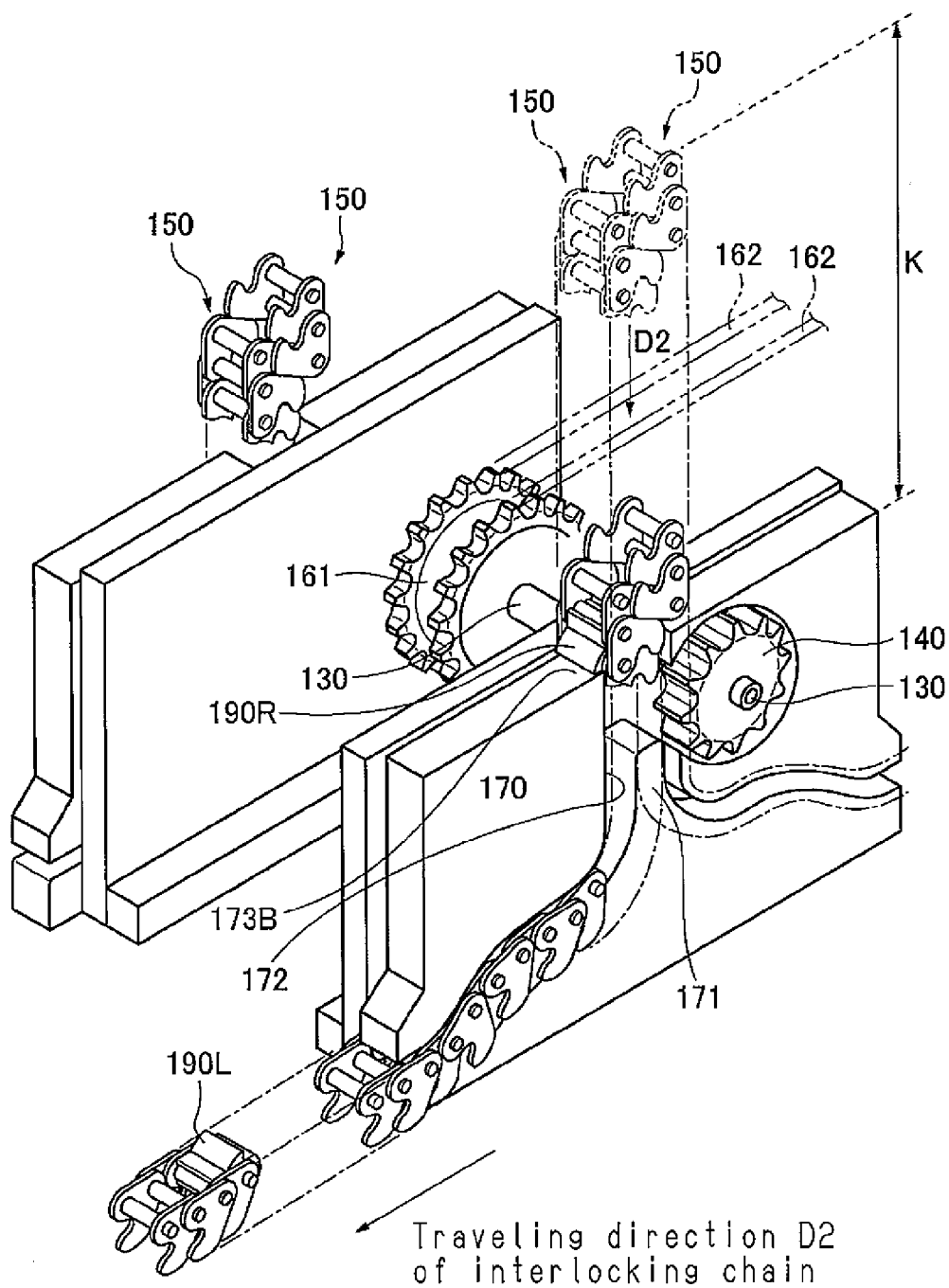
FIG. 8 is an enlarged perspective view of the portion near the driving sprocket and the interlocking chains shown in FIG. 1.
Figure 9:
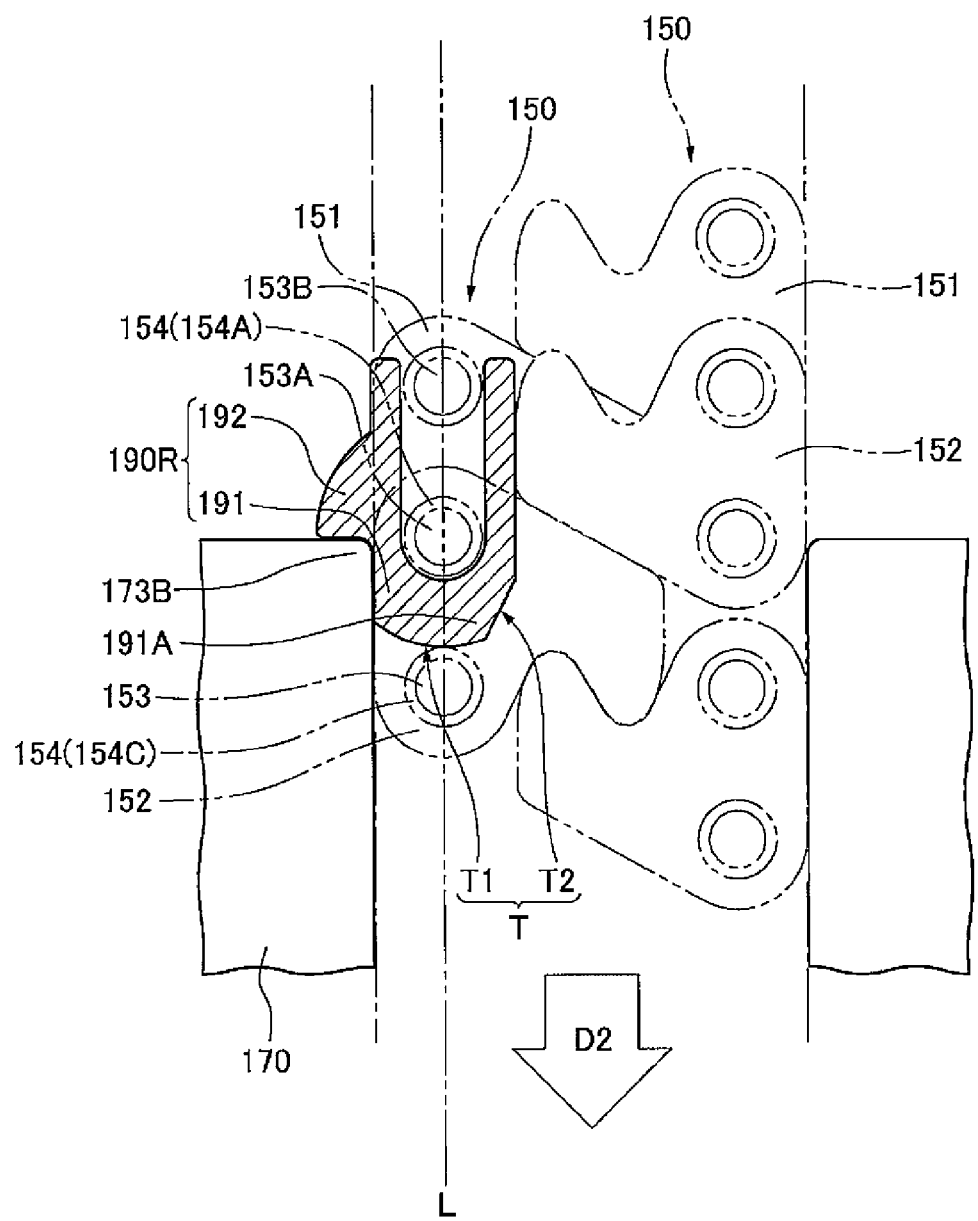
FIG. 9 is an enlarged view of the contact-stopped state of the interlocking chain stopper shown in FIG. 8.
Figure 10:
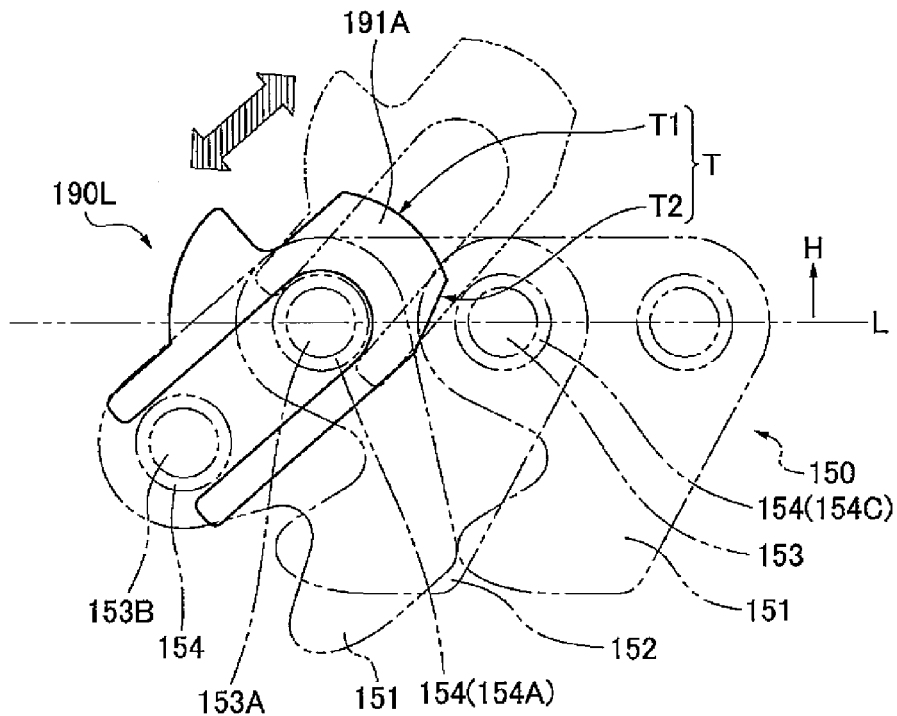
FIG. 10 is an enlarged view showing a mounting procedure of the interlocking chain stopper according to the embodiment of the invention.
Figure 11:
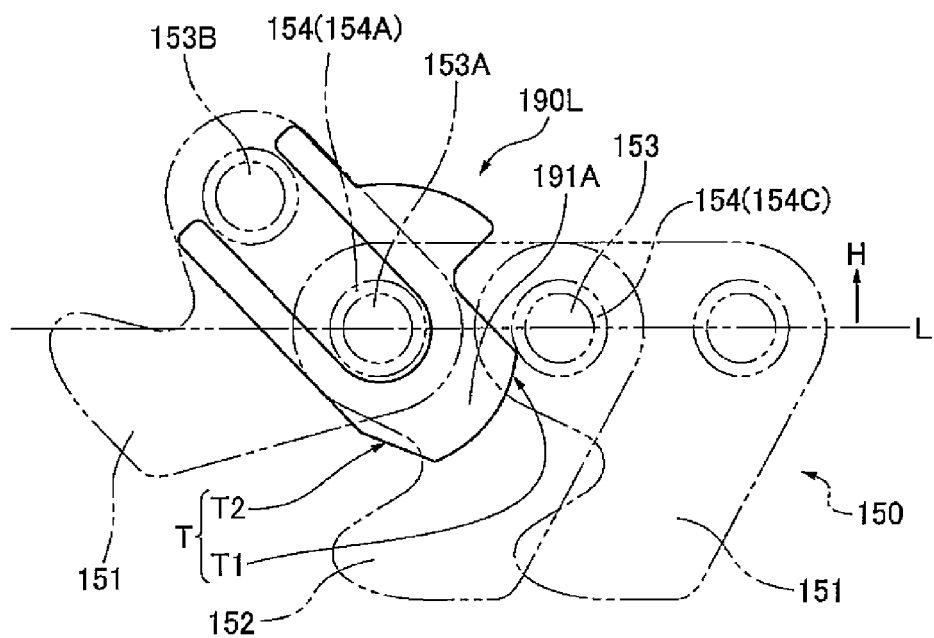
FIG. 11 is an enlarged view of a coming-off prevented state of the interlocking chain stopper according to the embodiment of the invention.
Figure 12:
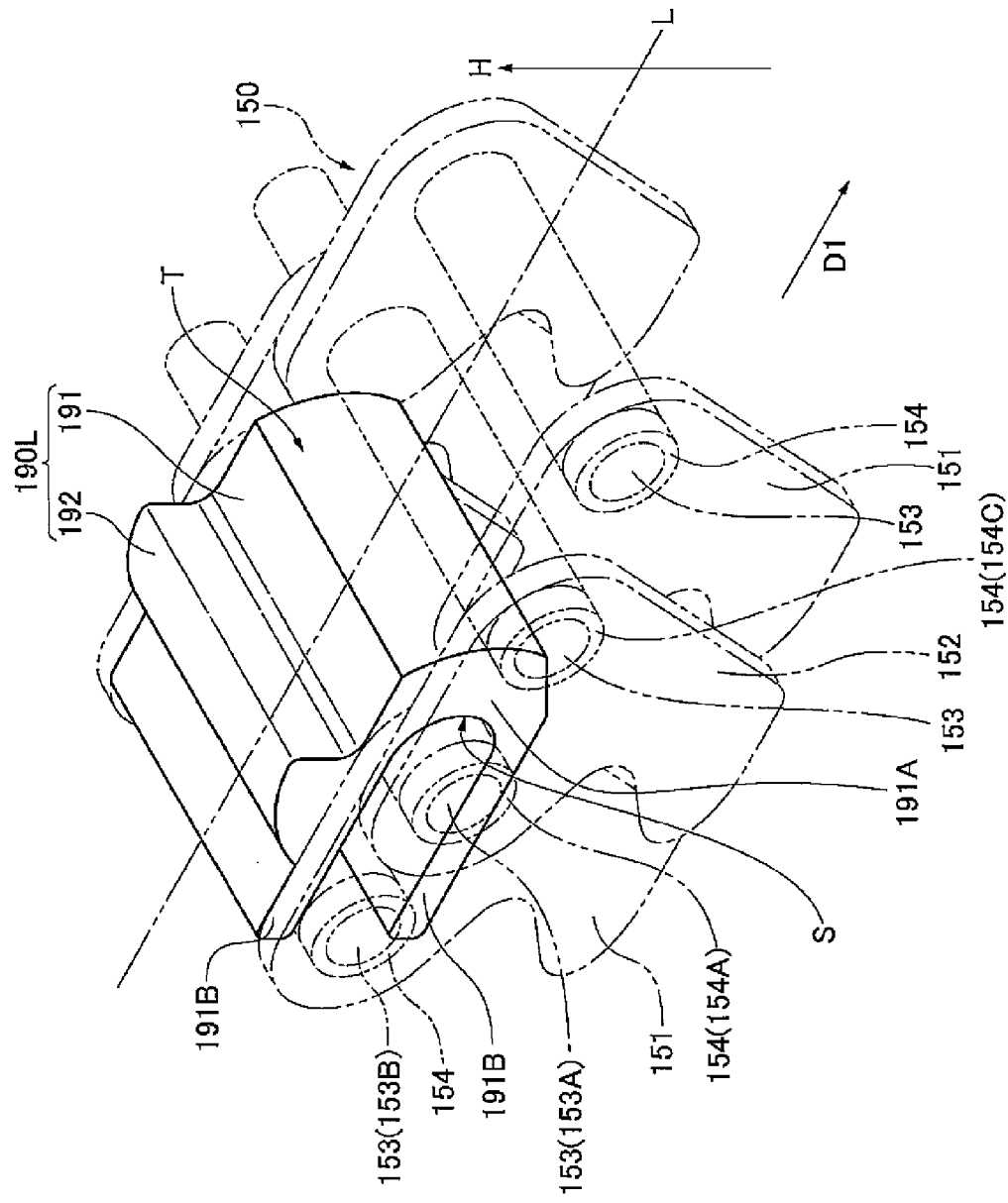
FIG. 12 is a perspective view of a variation of the interlocking chain to which the interlocking chain stopper according to the invention is mounted.
Figure 13:
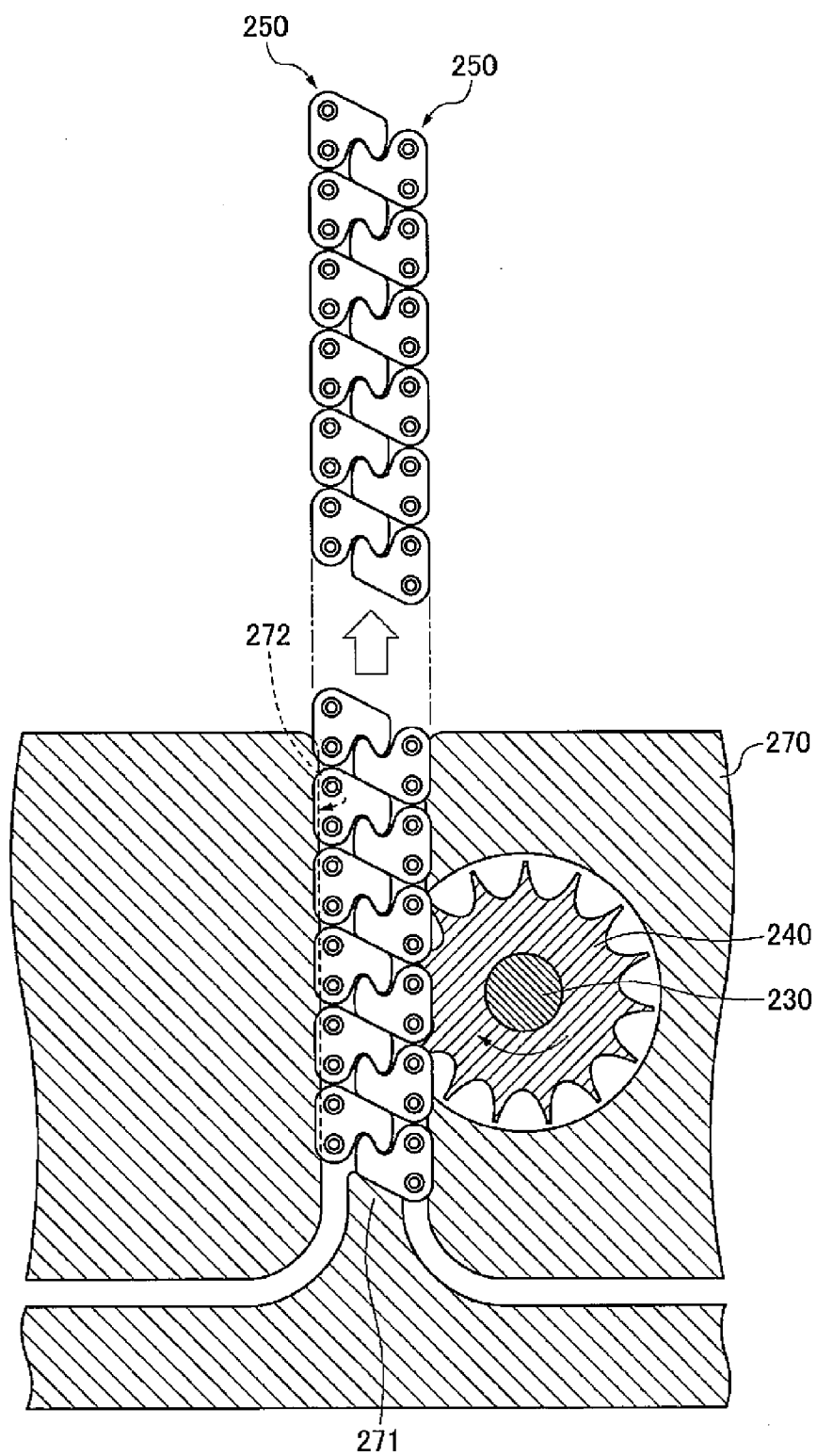
FIG. 13 is an enlarged view of a chain slipping-out state of interlocking chains according to a comparative example.

FIG. 1 is a general perspective view of an interlocking chain type forward and backward actuating device including interlocking chains to which the interlocking chain stopper according to the embodiment of the invention can be mounted. FIG. 2 is a perspective view showing an exploded state and a disengaged state of the pair of interlocking chains. FIG. 3 is an enlarged cross-sectional view of a portion near a driving sprocket and the interlocking chains shown in FIG. 1. FIG. 4 is an enlarged perspective view of the portion near the driving sprocket and the interlocking chains shown in FIG. 1. FIG. 5 is a perspective view of a mounted state of the interlocking chain stopper according to the embodiment of the invention. FIG. 6 is an enlarged view of a contact-stopped state of the interlocking chain stopper shown in FIG. 4. FIG. 7 is a plan view of a mounted state of the interlocking chain stopper according to the embodiment of the invention. FIG. 8 is an enlarged perspective view of the portion near the driving sprocket and the interlocking chains shown in FIG. 1. FIG. 9 is an enlarged view of the contact-stopped state of the interlocking chain stopper shown in FIG. 8. FIG. 10 is an enlarged view showing a mounting procedure of the interlocking chain stopper according to the embodiment of the invention. FIG. 11 is an enlarged view of a coming-off prevented state of the interlocking chain stopper according to the embodiment of the invention. FIG. 12 is a perspective view of a variation of the interlocking chains to which the interlocking chain stopper according to the invention is to be mounted.

First, as shown in FIGS. 1 to 4, an interlocking chain type forward and backward actuating device 100 for driving interlocking chains having interlocking chain stoppers 190L and 190R according to the embodiment is installed to lift and lower a driven body 110 such as a lift table, on which a heavy object (not shown) as a workpiece is placed, parallel to an installation face as shown in FIG. 1.

As shown in FIGS. 1 to 3, the interlocking chain type forward and backward actuating device 100 includes as basic device structures a base plate 120, a pair of interlocking chains 150, 150, a chain driving mechanism 160, chain guide plates 170, and chain housing means 180. The base plate 120 is mounted on the installation face, with which the above-described driven body 110 lifts and lowers in parallel. The interlocking chains 150, 150 are driven for forward and backward movements by driving sprockets 140 for rotating normally and reversely about a rotating shaft 130 arranged parallel to the base plate 120. The interlocking chains 150, 150 of each pair get interlocked and face each other to integrally become rigid and get disengaged from each other to bifurcate. The chain driving mechanism 160 includes a driven sprocket 161 for rotating the driving sprockets 140, power transmitting chains 162 for transmitting power to the driven sprocket 161, and a driving motor 163 as a driving source for driving the power transmitting chains 162. Each of the chain guide plates 170 has a chain leading plate 171 and a chain guide 172 located in a bifurcation area at a deviating position of the paired interlocking chains 150, 150 to respectively lead the paired interlocking chains 150, 150. Each of chain housing means 180 is formed by a chain housing box 181 of a chain reeling type. The interlocking chain type forward and backward actuating device 100 transmits motor torque of the driving motor 163, without wasting it, by directly supporting and pushing up the driven body 110 with the paired interlocking chains 150, 150.

The above-described interlocking chain type forward and backward actuating device 100 includes the two chain units, each of which has the above-described pairs of interlocking chains 150, 150 so that the total load applied from the driven body 110 is divided into two and shared between the pairs of interlocking chains 150, 150 for a reduced load for each pair.

In the interlocking chain type forward and backward actuating device 100, sprocket teeth of the driving sprocket 140 get engaged with bushings 154 forming the interlocking chain 150 to thereby drive the pair of interlocking chains 150, 150.

Each of the paired interlocking chains 150, 150 used in the interlocking chain type forward and backward actuating device 100 includes pairs of hook-shaped inner tooth plates 151 and pairs of hook-shaped outer tooth plates 152. The hook-shaped inner tooth plates 151 of each pair are located away from each other in a chain width direction W and connected and fixed to each other by respectively fitting front and back paired connecting pins 153 into the bushings 154 and press-fitting the bushings 154 into the hook-shaped inner tooth plates 151. The hook-shaped outer tooth plates 152 of each pair are respectively arranged to be adjacent to outer sides of the paired hook-shaped inner tooth plates 151 in the chain width direction W. The hook-shaped outer tooth plates 152 are arranged alternately with the hook-shaped inner tooth plates 151 with respect to the connecting pins 153 in a chain longitudinal direction with the front and back paired connecting pins 153 respectively press-fitted into the hook-shaped outer tooth plates 152. The paired interlocking chains 150, 150 is formed by connecting a large number of hook-shaped inner tooth plates 151 and a large number of hook-shaped outer tooth plates 152 by the pairs of front and back connecting pins 153 in the chain longitudinal direction. The paired interlocking chains 150, 150 get interlocked with each other to become rigid and get disengaged from each other to bifurcate.

Next, interlocking chain stoppers 190L and 190R according to the embodiment of the present invention will be described with reference to FIGS. 4 to 11.

As shown in FIGS. 4 to 11, the interlocking chain stopper 190L or 190R according to the embodiment is mounted into a clearance area formed between the paired hook-shaped inner tooth plates located in at least one of the above-described paired interlocking chains 150, 150, i.e., the left interlocking chain 150 of the pair of interlocking chains 150, 150 positioned on the front side in FIG. 4.

Next, a concrete form of the most characteristic structure of the above-described interlocking chain stopper 190L or 190R of the embodiment will be described more specifically with reference to FIGS. 4 to 11.

As shown in FIGS. 4 to 6, the interlocking chain stopper 190L includes an interlocking chain stopper mounting portion 191 and a contact-stop protrusion 192. The contact-stop protrusion 192 protrudes outside the hook-shaped inner tooth plates 151 and the hook-shaped outer tooth plates 152 from the interlocking chain stopper mounting portion 191 in a direction H toward an inner side of a chain locus L when one of the interlocking chains 150 bends during driving of the paired interlocking chains 150, 150 when seen from the one interlocking chain 150. The contact-stop protrusion 192 is brought into contact with and stopped by a contact-stop point 173A provided at a periphery of the chain locus L during driving of the paired interlocking chains 150, 150.

In this way, the interlocking chain stopper 190L stops driving of the paired interlocking chains 150, 150 without carrying out electrical or mechanical control processing using a position sensor or the like. Therefore, slipping out of the chains and excessive entry of the chains into the chain guide 172 are reliably avoided by restricting driving of the paired interlocking chains 150, 150, a step for setting lengths of the interlocking chains 150 can be omitted, and a chain unreeled length K can be changed freely according to usage of the device by changing a position of the one interlocking chain 150 where the interlocking chain stopper 190L is mounted after the interlocking chains 150 are once mounted to the device.

In the interlocking chain stopper 190L of the embodiment, the interlocking chain stopper mounting portion 191 has an inner peripheral face S, a U-shaped mounting portion 191A, and paired straight leg portions 191B, 191B. The inner peripheral face S is along an outer peripheral face of the bushing 154A, into which one connecting pin 153A of the pair of front and back connecting pins 153A and 153B is fitted. The U-shaped mounting portion 191A surrounds the bushing 154A, into which the one connecting pin 153A is fitted, from a traveling direction D1 of the one interlocking chain 150. The straight leg portions 191B, 191B extend along the chain locus L of the one interlocking chain 150 from opposite ends of the U-shaped mounting portion 191A and are located on opposite sides of at least the one connecting pin 153A.

In this way, the interlocking chain stopper 190L is reliably fixed and backlash of the interlocking chain stopper 190L during the driving of the interlocking chains 150 is avoided. Therefore, the mounted position of the interlocking chain stopper 190L can be changed and the interlocking chain stopper 190L can be fixed to the interlocking chain 150 at the same time.

Moreover, the interlocking chain stopper 190L of the embodiment has the paired straight leg portions 191B, 191B respectively extending from the one connecting pin 153A to the other connecting pin 153B of the pair of front and back connecting pins 153A and 153B. Therefore, force F applied from the contact-stop protrusion 192 when the contact-stop protrusion 192 is brought into contact with the contact-stop point 173A is dispersed to the front and back paired connecting pins 153A and 153B. Therefore, the force F applied to the interlocking chain stopper 190L and the one interlocking chain 150, to which the interlocking chain stopper 190L is mounted, is not concentrated on a certain point to thereby avoid damage to the interlocking chain stopper 190L and the one interlocking chain 150, slipping out and excessive entry of the chains are reliably avoided, the step for setting the lengths of the interlocking chains 150 is avoided, and the chain unreeled length K can be changed freely.

As shown in FIGS. 4 to 7, in the interlocking chain stopper 190L of the embodiment, an outer face T of the U-shaped mounting portion 191A and the inner peripheral face S of the U-shaped mounting portion 191A overlap arcs of concentric circles CA and CB about the center of the one connecting pin 153A in an imaginary plane P intersecting a center line of the one connecting pin 153A. The thickness of the U-shaped mounting portion 191A is set such that the U-shaped mounting portion 191A can be fitted between the bushing 154A in contact with the inner peripheral face S of the U-shaped mounting portion 191A and the bushing 154C adjacent to the bushing 154A in contact with the inner peripheral face S of the U-shaped mounting portion 191A. Therefore, the interlocking chain stopper 190L is inserted between the bushing 154A and the bushing 154C adjacent to each other while the one interlocking chain 150 is bent in a direction toward an outer side of the chain locus L and the interlocking chain stopper 190L is located between the paired hook-shaped inner tooth plates 151, 151 without coming off of the U-shaped mounting portion 191A from the interlocking chain 150 and obstruction of bending of the interlocking chain 150. Therefore, driving of the interlocking chain 150 is not obstructed and disengagement from the interlocking chain stopper 190L is avoided until the contact-stop protrusion 192 is brought into contact with the contact-stop point 173A, slipping out of the chains and excessive entry of the chains are avoided, and the constant chain unreeled length K according to the mounted position is maintained.

As shown in FIG. 6, since a lower face of the contact-stop point 173A, i.e., a guide face for the interlocking chain 150 and side faces of the hook-shaped inner tooth plate 151 and the hook-shaped outer tooth plate 152 overlap one another when seen in the chain width direction W, the interlocking chain stopper 190L does not obstruct driving of the chain and allow driving of the interlocking chain 150 without trouble until the interlocking chain stopper 190L is brought into contact with and stopped by the contact-stop point 173A.

Next, with reference to FIGS. 8 and 9, the interlocking chain stopper 190R according to the embodiment will be described.

Since the interlocking chain stopper 190R is different from the above-described interlocking chain stopper 190L only in the mounted position at the interlocking chain 150, common portions shared with the interlocking chain stopper 190L will be provided with common reference numerals and specific description of them will be omitted.

As shown in FIGS. 8 and 9, the interlocking chain stopper 190R of the embodiment restricts driving of the interlocking chain 150 when the one interlocking chain 150 is driven in a reverse direction to the above-described traveling direction D1, i.e., a traveling direction D2.

In other words, the contact-stop protrusion 192 is brought into contact with and stopped by a contact-stop point 173B provided at a periphery of a chain locus L during driving of the paired interlocking chains 150, 150 to thereby stop the driving of the paired interlocking chains 150, 150 without carrying out electrical or mechanical control processing using a position sensor or the like. Therefore, the driving of the paired interlocking chains 150, 150 is restricted and excessive entry of the chains into the chain guide 172 is reliably avoided.

As shown in FIG. 9, since an inner face of the contact-stop point 173B, i.e., a guide face for the interlocking chain 150 and side faces of the hook-shaped inner tooth plate 151 and the hook-shaped outer tooth plate 152 overlap one another when seen in the chain width direction W, the interlocking chain stopper 190R exerts a chain restricting function without interference of and biting of the contact-stop protrusion 192 with and into the chain guide when the interlocking chain 150 almost disengages from the chain guide.

Next, with reference to FIGS. 5, 6, 10, and 11, a mounted state of the interlocking chain stopper 190L will be described.

Since a mounted state of the interlocking chain stopper 190R is different from the mounted state of the interlocking chain stopper 190L only in a mounted orientation according to the traveling direction D1 or D2 of the interlocking chain 150, specific description of the mounted state of the interlocking chain stopper 190R will be omitted.

As shown in FIGS. 5, 6, 10, and 11, in the interlocking chain stopper 190L, the outer face T of the U-shaped mounting portion 191A is formed by an outer arc face T1 facing the direction H toward the inner side of the chain locus L when the one interlocking chain 150 bends during the driving of the paired interlocking chains 150, 150 and an outer flat face T2 which faces in a direction toward the outer side of the chain locus L when the one interlocking chain 150 bends and which is continuous from the outer arc face T1.

In this way, the interlocking chain stopper 190L does not allow the outer flat face T2 to interfere with the bushing 154C when the interlocking chain stopper 190L is mounted while the one interlocking chain 150 is bent in the direction toward the outer side of the chain locus L during the driving of the paired interlocking chains 150, 150 when seen from the one interlocking chain 150, and the interlocking chain stopper 190L causes the outer arc face T1 to indirectly interfere with the interlocking chain 150 with the bushing 154C located therebetween while the one interlocking chain 150 is bent in the direction H toward the inner side of the chain locus L during the driving of the paired interlocking chains 150, 150 when seen from the one interlocking chain 150. Therefore, the interlocking chain stopper 190L is easily detachably mounted into the clearance area formed between the paired hook-shaped inner tooth plates 151 located in the one interlocking chain 150, the slipping out of the chains is avoided by preventing the interlocking chain stopper 190L from coming off the one interlocking chain 150 unless the one interlocking chain 150 is bent largely in the above-described direction toward the outer side, the step for setting the lengths of the interlocking chains 150 is avoided, and the unreeled length K of the interlocking chains 150 is easily changed by changing the mounted position.

Moreover, the thickness of the interlocking chain stopper 190L on front and back sides of the contact-stop protrusion 192 in the extending direction of the straight leg portions 191B is reduced so as not to protrude from the plate, and the thickness of the straight leg portion 191B not provided with the contact-stop protrusion 192 is increased. In this way, the interlocking chain stopper 190L is prevented from being caught in the chain guide when the interlocking chains 150 are housed while deviating and a load can be received easily by increasing the thickness of the straight leg portion 191B. In other words, smooth driving of the chains is possible by preventing breakage of the interlocking chain stopper 190L under the load and preventing the interlocking chain stopper 190L from being caught.

Moreover, even if the connecting pin 153A is short as shown in FIG. 12, it does not hinder driving of the interlocking chains 150 at all.

Each of the interlocking chain stoppers 190L and 190R of the embodiment obtained as described above includes the contact-stop protrusion 192 protruding outside the hook-shaped inner tooth plates 151 and the hook-shaped outer tooth plates 152, respectively, from the interlocking chain stopper mounting portion 191 in the direction H toward the inner side of the chain locus L when the one interlocking chain 150 bends during the driving of the paired interlocking chains 150, 150 when seen from the one interlocking chain 150, and the contact-stop protrusion 192 is brought into contact with and stopped by the contact-stop point 173A provided at the periphery of the chain locus L during driving of the paired interlocking chains 150, 150. In this way, great advantages are obtained, e.g., the slipping out of the chains and excessive entry of the chains are reliably avoided by restricting the driving of the paired interlocking chains 150, 150 and the chain unreeled length K can be freely changed by changing the mounted position.

DESCRIPTION OF THE REFERENCE NUMERALS

100 . . . interlocking chain type forward and backward actuating device
110 . . . driven body
120 . . . base plate
130, 230 . . . rotating shaft
140, 240 . . . driving sprocket
150, 250 . . . interlocking chain
151 . . . hook-shaped inner tooth plate
152 . . . hook-shaped outer tooth plate
153 . . . connecting pin
153A . . . one connecting pin
153B . . . other connecting pin
154, 154A, 154C . . . bushing
160 . . . chain driving mechanism
161 . . . driven sprocket
162 . . . power transmitting chain
170, 270 . . . chain guide plate
171, 271 . . . chain leading plate
172, 272 . . . chain guide
173A, 173B . . . contact-stop point
190L, 190R . . . interlocking chain stopper
191 . . . interlocking chain stopper mounting portion
191A . . . U-shaped mounting portion
191B . . . straight leg portion
192 . . . contact-stop protrusion CA, CB . . . concentric circle
D1, D2 . . . traveling direction of interlocking chain
H . . . direction toward inner side of chain locus
K . . . chain unreeled length
L . . . chain locus
S . . . inner peripheral face of U-shaped mounting portion
T . . . outer face of U-shaped mounting portion
T1 . . . outer arc face forming part of outer face of U-shaped mounting portion
T2 . . . outer flat face forming part of outer face of U-shaped mounting portion
W . . . chain width direction of interlocking chain

The invention claimed is:

1. An interlocking chain type lift device, comprising:
an interlocking chain comprising first and second hook-shaped inner tooth plates and first and second hook-shaped outer tooth plates, wherein a clearance area is provided between the first and second hook-shaped inner tooth plates;
wherein the first and second hook-shaped inner tooth plates are located away from each other in a width direction of said interlocking chain and are connected to each other by first and second connecting pins press-fit into first and second bushings provided in the inner tooth plates;
the first hook-shaped outer tooth plate arranged adjacent to an outer side of the first hook-shaped inner tooth plate, and the second hook-shaped outer tooth plate arranged adjacent to an outer side of the second hook-shaped inner tooth plate;
the first and second hook-shaped outer tooth plates arranged alternately with the hook-shaped inner tooth plates with respect to the first and second connecting pins in a chain longitudinal direction and wherein each of the first and the second connecting pins are press-fit into at least one inner tooth plate and at least one outer tooth plate;
the interlocking chain adapted for interconnection with a second interlocking chain to become rigid, and adapted to bifurcate from said second interlocking chain;
an interlocking chain stopper provided in said clearance area of said interlocking chain, the interlocking chain stopper comprising a contact-stop protrusion and an interlocking chain stopper mounting portion;
the contact-stop protrusion protruding from the interlocking chain stopper mounting portion outside the hook-shaped inner tooth plates and the hook-shaped outer tooth plates and toward an inner side of a chain locus provided when at least a first hook-shaped inner tooth plate and a first hook-shaped out tooth plate rotate relative to each other during driving of the interlocking chain; and
wherein the contact-stop protrusion is brought into contact with and stopped by a contact-stop point provided on a chain guide plate of the interlocking chain type lift device during driving of the interlocking chain.

2. The interlocking chain type lift device according to claim 1, wherein the interlocking chain stopper mounting portion comprising:
an inner peripheral face into which one of first and second connecting pins is received,
a U-shaped mounting portion for at least partially surrounding at least one of the first and second bushings; and
paired straight leg portions, which extend along the chain locus of the interlocking chain from the U-shaped mounting portion and on opposite sides of at least one of the first and second connecting pins.

3. The interlocking chain type lift device according to claim 2, wherein the paired straight leg portions respectively extend from the first connecting pin to the second connecting pin.

4. The interlocking chain type lift device according to claim 2, wherein
an outer face of the U-shaped mounting portion and an inner peripheral face of the U-shaped mounting portion overlap arcs of two concentric circles about a center of the one connecting pin in an imaginary plane intersecting a center line of the first connecting pin, and
a thickness of the U-shaped mounting portion is set such that the U-shaped mounting portion can be fitted between i) the bushing in contact with the inner peripheral face of the U-shaped mounting portion or the roller fitted over the bushing and ii) the bushing or the roller adjacent to the bushing in contact with the inner peripheral face of the U-shaped mounting portion or the roller fitted over the bushing.

5. The interlocking chain type lift device according to claim 4, wherein the outer face of the U-shaped mounting portion is formed by an outer arc face facing the direction toward the inner side of the chain locus when the interlocking chain bends, and an outer flat face that faces in a direction toward an outer side of the chain locus when the interlocking chain bends and is continuous from the outer arc face.

6. A chain stopper adapted to be provided in a clearance area of an interlocking chain device, the chain stopper comprising:
a contact-stop protrusion adapted to contact a contact-stop point provided on an interlocking chain device;
an interlocking chain stopper mounting portion;
the contact-stop protrusion protruding from the interlocking chain stopper mounting portion and adapted to extend toward an inner side of a radius of curvature of an interlocking chain device; and
the interlocking chain stopper mounting portion comprising an inner peripheral face with a U-shaped mounting portion having straight leg portions, the inner peripheral face adapted to receive a pin of an interlocking chain device.

* * * * *